United States Patent
Tan et al.

(10) Patent No.: US 12,407,515 B2
(45) Date of Patent: Sep. 2, 2025

(54) CODEC MANAGEMENT AT AN INFORMATION HANDLING SYSTEM

(71) Applicant: Dell Products L.P., Round Rock, TX (US)

(72) Inventors: Danilo Ong Tan, Austin, TX (US); Douglas Wayne Gillespie, Anna, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 18/448,280

(22) Filed: Aug. 11, 2023

(65) Prior Publication Data
US 2025/0055689 A1    Feb. 13, 2025

(51) Int. Cl.
*H04L 29/06*    (2006.01)
*H04L 9/32*    (2006.01)

(52) U.S. Cl.
CPC ........ *H04L 9/3213* (2013.01); *H04L 2209/34* (2013.01)

(58) Field of Classification Search
CPC .......................... H04L 9/3213; H04L 2209/34
See application file for complete search history.

(56) References Cited

U.S. PATENT DOCUMENTS

| | | | | |
|---|---|---|---|---|
| 11,461,771 B2* | 10/2022 | Coburn | ............... | G06F 16/2255 |
| 11,665,382 B2* | 5/2023 | Ericson | ................ | H04L 9/0825 |
| | | | | 713/171 |
| 2008/0080694 A1* | 4/2008 | Usuba | ................ | H04M 1/2535 |
| | | | | 379/219 |
| 2017/0244688 A1* | 8/2017 | Kim | ....................... | H04L 63/107 |
| 2021/0178996 A1* | 6/2021 | Verma | .................. | G07C 5/0808 |
| 2024/0187619 A1* | 6/2024 | Zhang | .................... | H04N 19/42 |
| 2025/0056023 A1* | 2/2025 | Tan | ........................ | H04N 19/42 |

\* cited by examiner

*Primary Examiner* — Shawnchoy Rahman
(74) *Attorney, Agent, or Firm* — McDermott Will & Schulte LLP

(57) ABSTRACT

Enabling codecs at an IHS including: accessing a local token store that stores tokens, each token associated with a codec; identifying codecs enabled at the IHS based on the tokens; receiving a request to encode or decode a media file, the media file associated with a particular codec for encoding or decoding of the media file; determining that the particular codec is not enabled at the IHS based on the previously identified enabled codecs, and in response, transmitting a request to a cloud codec management service; receiving the particular token, the particular token signed and unique to the IHS, and in response, storing the particular token at the local token store; restarting the driver, and in response, accessing the local token store; obtaining from the local token store, the particular token, and in response, enabling the particular codec for the media file.

20 Claims, 3 Drawing Sheets

CODEC MANAGEMENT AT AN INFORMATION HANDLING SYSTEM

BACKGROUND

Field of the Disclosure

The disclosure relates generally to an information handling system, and in particular, codec management at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of enabling codecs at an information handling system, including: accessing, by a driver, a local token store at a first time that stores one or more tokens, each token associated with a codec; identifying, by the driver, one or more codecs enabled at the information handling system based on the tokens stored by the local token store; receiving, at a media framework, a request to encode or decode a media file, the media file associated with a particular codec for encoding or decoding of the media file; determining, by the driver, that the particular codec is not enabled at the information handling system based on the previously identified enabled codecs; in response to determining that the particular codec is not enabled at the information handling system, transmitting a request to a cloud codec management service; receiving, from the cloud codec management service, the particular token, the particular token signed and unique to the information handling system; in response to receiving the particular token: storing the particular token at the local token store; restarting the driver, and in response, accessing, by the driver, the local token store at a second time after the first time; obtaining, by the driver and from the local token store, the particular token; and in response to obtaining the particular token, enabling, by the driver, the particular codec for the media file.

Other embodiments of these aspects include corresponding systems, apparatus, and computer programs, configured to perform the actions of the methods, encoded on computer storage devices.

These and other embodiments may each optionally include one or more of the following features. For instance, in response to enabling the particular codec, encoding the media file utilizing the particular codec. In response to enabling the particular codec, decoding the media file utilizing the particular codec. Generating, at the cloud codec management service, the particular token; signing, at the cloud codec management service, the particular token as unique to the information handling system; and providing, by the cloud codec management service, the particular token to the information handling system. Storing, by the cloud codec management service and at a cloud data store, data indicating the generation of the particular token. In response to receiving the particular token: verifying the particular token, and in response, storing the particular token at the local token store. In response to obtaining the particular token: verifying the particular token, and in response, enabling, by the driver, the particular codec for the media file. In response to determining that the particular codec is not enabled at the information handling system: displaying, upon a display of the information handling system, a notification indicating that the particular codec is not enabled at the information handling system; and receiving, in response to the notification, user input indicating enablement of the codec. In response to receiving the user input, transmitting the request to the cloud codec management service.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
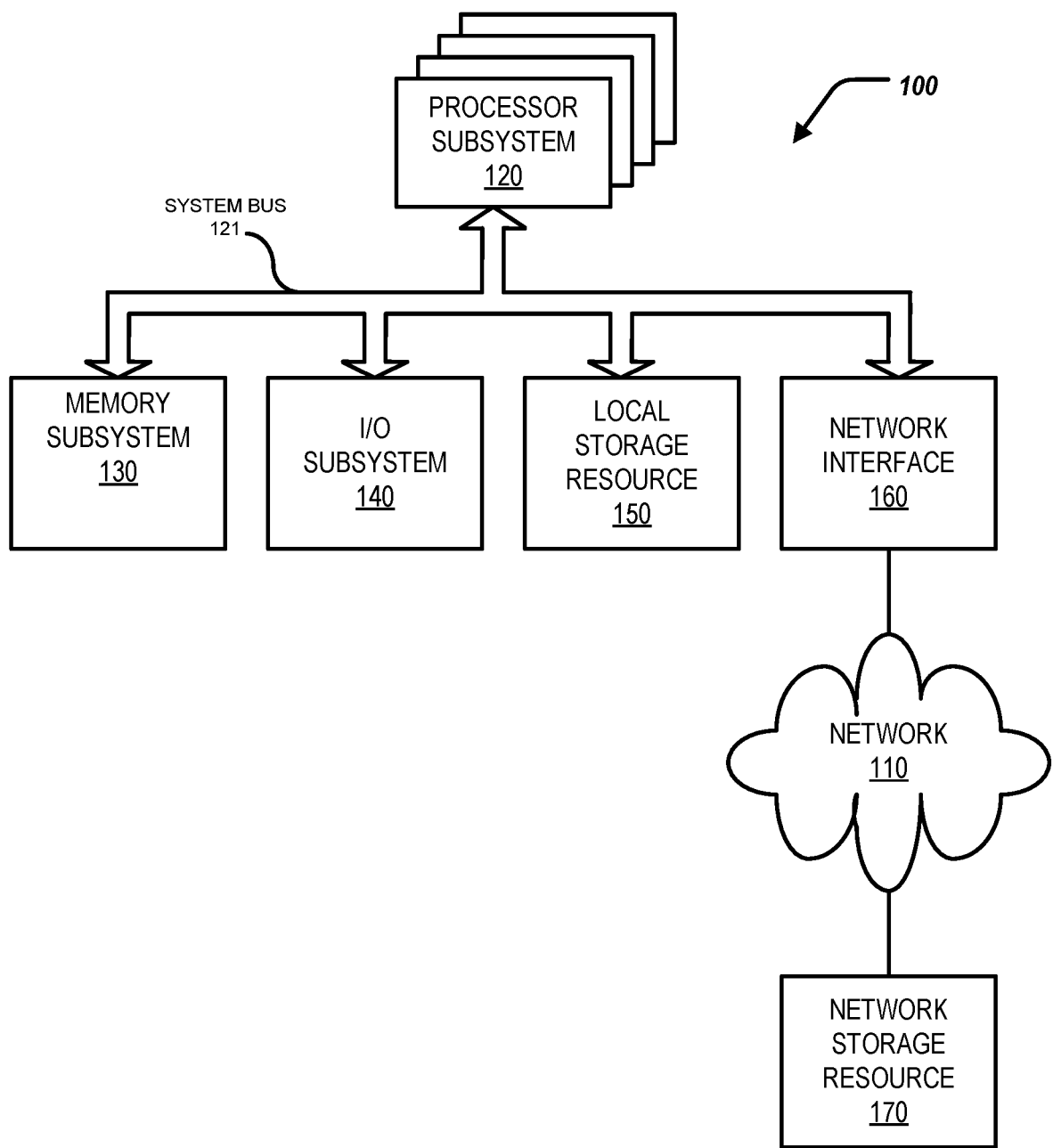
FIG. 1 is a block diagram of selected elements of an embodiment of an information handling system.

This disclosure discusses methods and systems for codec management of an information handling system. In short, codecs at the information handling system can be initially disabled until the codec is needed to decode or encode a media file. The information handling system can communicate with a cloud codec management service to receive an appropriate token for enablement of such a codec. When the token is received for a codec, the media file than can be encoded or decoded utilizing the codec.

Specifically, this disclosure discusses a system and a method for enabling codecs at an information handling system, including accessing, by a driver, a local token store at a first time that stores one or more tokens, each token associated with a codec; identifying, by the driver, one or more codecs enabled at the information handling system based on the tokens stored by the local token store; receiving, at a media framework, a request to encode or decode a media file, the media file associated with a particular codec for encoding or decoding of the media file; determining, by the driver, that the particular codec is not enabled at the information handling system based on the previously identified enabled codecs; in response to determining that the particular codec is not enabled at the information handling system, transmitting a request to a cloud codec management service; receiving, from the cloud codec management service, the particular token, the particular token signed and unique to the information handling system; in response to receiving the particular token: storing the particular token at the local token store; restarting the driver, and in response, accessing, by the driver, the local token store at a second time after the first time; obtaining, by the driver and from the local token store, the particular token; and in response to obtaining the particular token, enabling, by the driver, the particular codec for the media file.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
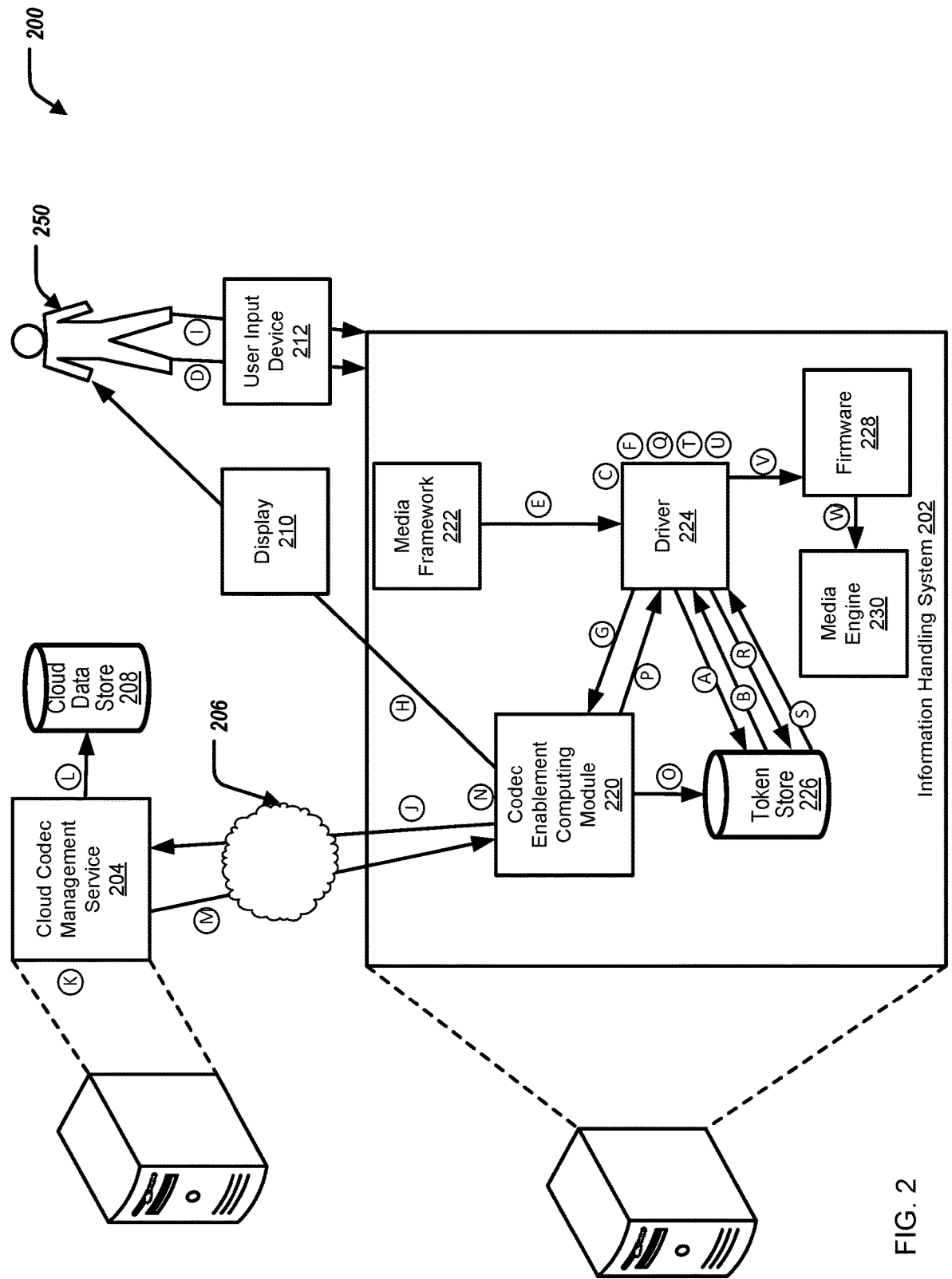
FIG. 2 illustrates a block diagram of an information handling system for codec management at the information handling system.
Figure 3:
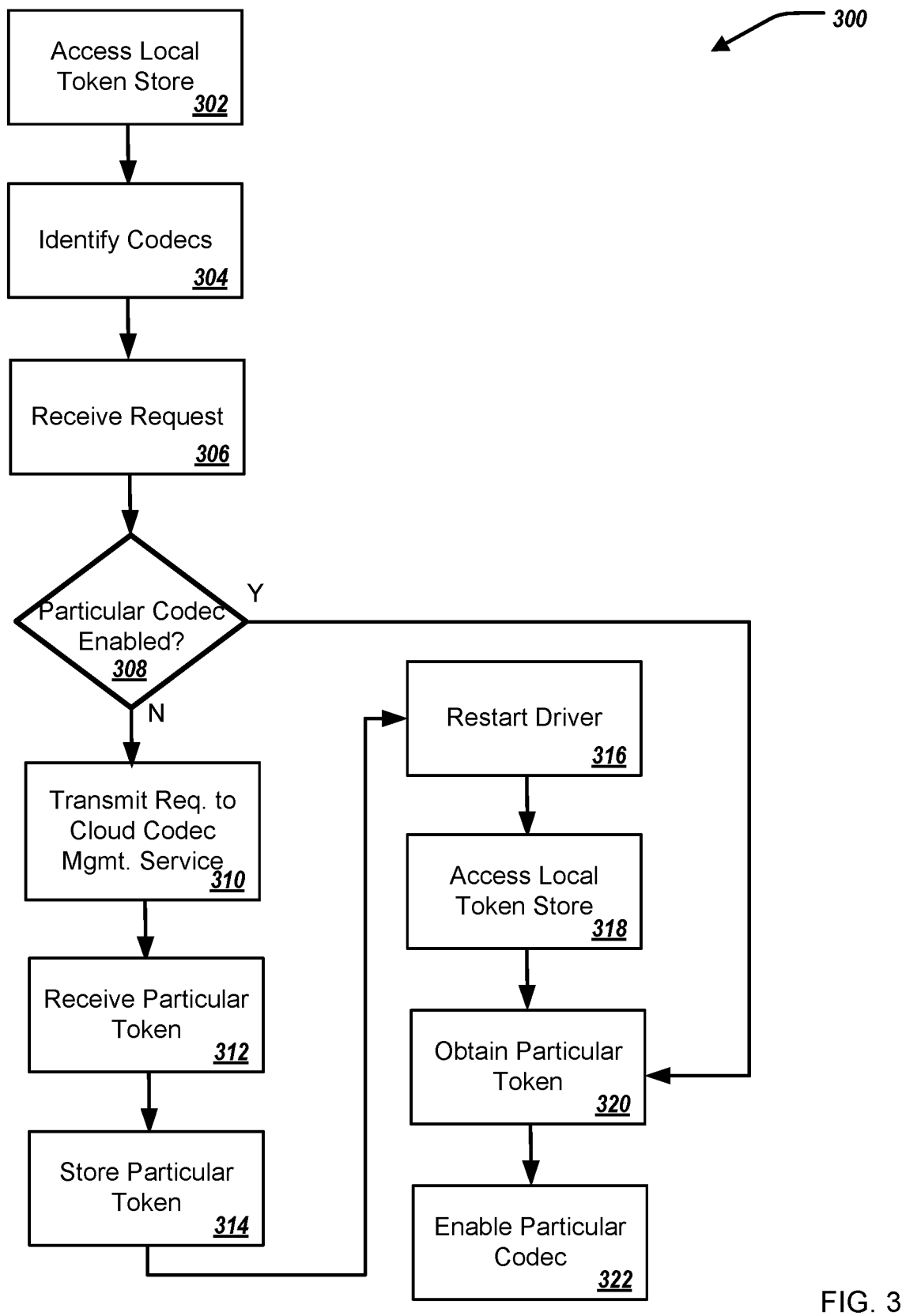
FIG. 3 illustrates a method for codec management at the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202, a cloud codec management service 204, a network 206, a cloud data store 208, a display 210, and an user input device 212. The information handling system 202 can include a codec enablement computing module 220, a media framework 222, a driver 224, a token store 226, firmware 228, and a media engine 230. In some examples, the information handling system 202 is similar to, or includes, the information handling system 100 of FIG. 1.

The information handling system 202 can be in communication with the cloud codec management service 204 over the network 206. The information handling system 202 can be in communication with the display 210 and the user input device 212. The codec enablement computing module 220 can be in communication with the driver 224, the token store 226, and the cloud codec management service 204. The media framework 222 can be in communication with the driver 224. The driver 224 can be in communication with the media framework 222, the codec enablement computing module 220, the token store 226, and the firmware 228. The token store 226 can be in communication with the codec enablement computing module 220 and the driver 224. The firmware 228 can be in communication with the driver 224 and the media engine 230. The media engine 230 can be in communication with the firmware 228. The cloud codec management server 204 can be in communication with the cloud data store 208.

In some examples, the media framework 222 is a video framework. In some examples, the driver 224 is a graphics driver (Gfx).

In some examples, the user input device 212 is any user input device or combination of multiple user input devices such as a keyboard, mouse, or similar.

In short, codecs at the information handling system 202 can be initially disabled until the codec is needed to decode or encode a media file. The information handling system 202 can communicate with the cloud codec management service to receive an appropriate token for enablement of such a codec. When the token is received for a codec, the media file than can be encoded or decoded utilizing the codec.

Specifically, the driver 224 accesses the token store 226 at a first time, at A. The local token store 226 stores one or more tokens. Each of the tokens is associated with a respective codec. The driver 224 can receive data identifying the tokens stored at the token store 226, at B. The driver 224 identifies one or more codecs enabled at the information handling system 202, at C. That is, the driver 224 identifies codecs enabled at the information handling system 202 based on the tokens stored by the token store 226. The user 250 can provide user input at the user input device 212, at D. The user input can indicate a request to encode or decode a media file. The media file can be associated with a particular codec for encoding or decoding of the media file. The information handling system 202 receives the user input. Specifically, the media framework 222 receives the user input.

The media framework 222 can communicate the request with the driver 224, at E. Specifically, the media framework 222 can communicate data indicating the particular codec, the media file, and/or details of the media file to the driver 224. The driver 224 can determine that the particular codec is not enabled at the information handling system, at F. That is, the driver 224 can determine that the particular codec is not enabled at the information handling system 202 based on the previously identified enabled codecs. Specifically, based on the previous access of the token store 226 to identify codecs enabled by the tokens at the token store 226 (at steps A and B), the driver 224 can determine that the particular codec is not enabled at the information handling system 202.

The driver 224 can provide data indicating that the particular codec is not enabled at the information handling system 202 to the codec enablement computing module 2220, at G. In some examples, the driver 224 can perform steps A and B in response to receiving the request, at E.

The codec enablement computing module 220 provides for display, upon the display 210, a notification indicating that the particular codec is not enabled at the information handling system 202, at H. In some examples, the notification can further indicate that encoding or decoding of the media file has failed. The user 250 provides user input, in response to the notification, indicting enablement of the codec, at I. The information handling system 202, and in particular, the codec enablement computing module 220, receives the user input indicating the enablement of the codec.

The codec enablement computing module 220, in response to receiving the user input, transmits a request to the cloud codec management service 204, e.g., over the network 206, at J. In other words, in response to the driver 224 determining that the particular codec is not enabled at the information handling system 202, the codec enablement computing module 220 transmits the request to the cloud codec management service 204. The request can include a request for a token for enablement of the codec at the information handling system 202.

The cloud codec management service 204 generates the particular token, at K. Further, the cloud codec management service 204 signs the particular token as unique to the information handling system 202, at K. That is, the particular token is tied to the information handling system 202 (platform) via serviceTag. The cloud codec management service 204 stores, at the cloud data store 208, data indicating the generation of the particular token, at L. That is, the cloud codec management service 204 tracks enablement of codecs at the information handling system 202 via generation of tokens associated with the codecs. The cloud codec management service 204 provides, over the network 206, the particular token to the information handling system 202, at M. Specifically, the codec enablement computing module 220 receives the particular token from the cloud codec management service 202. The particular token is signed and unique to the information handling system 202.

In response to receiving the particular token, the codec enablement computing module 220 verifies the particular token, at N. In some examples, verifying the particular token can include determining if an identification (ID) (e.g., svctag) of the particular token matches an ID of the information handling system 202. The codec enablement computing module 220, in response to verifying the particular token (at N), stores the particular token at the token store 226, at O. That is, in response to receiving the particular token (at M) and verifying the particular token (at N), the codec enablement computing module 220 store the particular token at the token store 226. In some examples, storing the particular token at the token store 226 can include storing the particular token as a UEFI variable, at a registry, or as a file.

The codec enablement computing module 220 transmit a signal to restart the driver 224, at P. In some examples, the information handling system 202 can be rebooted to restart the driver 224. The driver 224 can be restarted, at Q. In response to the driver 224 restarting, the driver 224 can access the token store 226 at a second time after the first time, at R. The driver 224 can obtain from the token store 226 the particular token, at S. The driver 224, in response to obtaining the particular token from the token store 226 (at S), verifies the particular token, at T. In some examples, verifying the particular token can include determining if an identification (ID) (e.g., svctag) of the particular token matches an ID of the information handling system 202. The driver 224, in response to verifying the particular token, enables the particular codec for the media file, at U. That is, the driver 224, in response to obtaining the particular token from the token store 226 and verifying the particular token, enables the particular codec for the media file, at U. The driver 224 provides the enabled codec to the media engine 230 through the firmware 228, at V and W. In some examples, in response to enabling the particular codec, the media engine 230 and/or the driver 224 can encode the media file utilizing the particular codec. In some examples, in response to enabling the particular codec, the media engine 230 and/or the driver 224 can decode the media file utilizing the particular codec.

FIG. 3 illustrates a flowchart depicting selected elements of an embodiment of a method 300 for codec management of an information handling system 202. The method 300 may be performed by the information handling system 100, the information handling system 202, and/or the cloud codec management service 204, and with reference to FIGS. 1-2. It is noted that certain operations described in method 300 may be optional or may be rearranged in different embodiments.

The driver 224 accesses the token store 226 at a first time, at 302. The driver 224 identifies codecs enabled at the information handling system 202 based on the tokens stored by the token store 226, at 304. The media framework 222 receives a request to encode or decode a media file, at 306. The driver 224 determines whether a particular codec is enabled at the information handling system 202 based on the previously identified enabled codecs, at 308. The particular codec is for encoding or decoding the media file.

In some examples, the driver 224 determines that the particular codec is not enabled at the information handling system 202, and in response, the codec enablement computing module 220 transmits a request to the cloud codec management service 204, at 310. The request can be for a particular token associated with the particular codec. The codec enablement computing module 220 receives, from the cloud codec management service 204, the particular token, at 312. The codec enablement computing module 220, in response to receiving the particular token, stores the particular token at the token store 226, at 314. The codec enablement computing module 220 restarts the driver 224, at 316. The driver 224 accesses the token store 226 at a second time after the first time, at 318. The driver 224 obtains from the token store 226 the particular token, at 320. The driver 224, in response to obtaining the particular token, enables the particular codec for the media file, at 322.

In some examples, the driver 224 determines that the particular codec is enabled at the information handling system 202, and in response, proceeds to step 320.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of enabling codecs at an information handling system, the method comprising:
   accessing, by a driver, a local token store at a first time that stores one or more tokens, each token associated with a codec;
   identifying, by the driver, one or more codecs enabled at the information handling system based on the tokens stored by the local token store;
   receiving, at a media framework, a request to encode or decode a media file, the media file associated with a particular codec for encoding or decoding of the media file;
   determining, by the driver, that the particular codec is not enabled at the information handling system based on the previously identified enabled codecs;
   in response to determining that the particular codec is not enabled at the information handling system, transmitting a request to a cloud codec management service;
   receiving, from the cloud codec management service, the particular token, the particular token signed and unique to the information handling system;
   in response to receiving the particular token:
      storing the particular token at the local token store;
      restarting the driver, and in response, accessing, by the driver, the local token store at a second time after the first time;
      obtaining, by the driver and from the local token store, the particular token; and
      in response to obtaining the particular token, enabling, by the driver, the particular codec for the media file.

2. The computer-implemented method of claim 1, further including:
   in response to enabling the particular codec, encoding the media file utilizing the particular codec.

3. The computer-implemented method of claim 1, further including:
   in response to enabling the particular codec, decoding the media file utilizing the particular codec.

4. The computer-implemented method of claim 1, further including:
   generating, at the cloud codec management service, the particular token;
   signing, at the cloud codec management service, the particular token as unique to the information handling system; and
   providing, by the cloud codec management service, the particular token to the information handling system.

5. The computer-implemented method of claim 4, further including:
   storing, by the cloud codec management service and at a cloud data store, data indicating the generation of the particular token.

6. The computer-implemented method of claim 1, further in response to receiving the particular token:
   verifying the particular token, and in response, storing the particular token at the local token store.

7. The computer-implemented method of claim 6, further in response to obtaining the particular token:
   verifying the particular token, and in response, enabling, by the driver, the particular codec for the media file.

8. The computer-implemented method of claim 1, further in response to determining that the particular codec is not enabled at the information handling system:
   displaying, upon a display of the information handling system, a notification indicating that the particular codec is not enabled at the information handling system; and
   receiving, in response to the notification, user input indicating enablement of the codec.

9. The computer-implemented method of claim 8, in response to receiving the user input, transmitting the request to the cloud codec management service.

10. An information handling system comprising a processor having access to memory media storing instructions executable by the processor to perform operations, comprising:
   accessing, by a driver, a local token store at a first time that stores one or more tokens, each token associated with a codec;
   identifying, by the driver, one or more codecs enabled at the information handling system based on the tokens stored by the local token store;
   receiving, at a media framework, a request to encode or decode a media file, the media file associated with a particular codec for encoding or decoding of the media file;
   determining, by the driver, that the particular codec is not enabled at the information handling system based on the previously identified enabled codecs;
   in response to determining that the particular codec is not enabled at the information handling system, transmitting a request to a cloud codec management service;
   receiving, from the cloud codec management service, the particular token, the particular token signed and unique to the information handling system;
   in response to receiving the particular token:
      storing the particular token at the local token store;
      restarting the driver, and in response, accessing, by the driver, the local token store at a second time after the first time;
      obtaining, by the driver and from the local token store, the particular token; and
   in response to obtaining the particular token, enabling, by the driver, the particular codec for the media file.

11. The information handling system of claim 10, the operations further including:
   in response to enabling the particular codec, encoding the media file utilizing the particular codec.

12. The information handling system of claim 10, the operations further including:
   in response to enabling the particular codec, decoding the media file utilizing the particular codec.

13. The information handling system of claim 10, the operations further including:
   generating, at the cloud codec management service, the particular token;
   signing, at the cloud codec management service, the particular token as unique to the information handling system; and
   providing, by the cloud codec management service, the particular token to the information handling system.

14. The information handling system of claim 13, the operations further including:
   storing, by the cloud codec management service and at a cloud data store, data indicating the generation of the particular token.

15. The information handling system of claim 10, the operations further in response to receiving the particular token:
   verifying the particular token, and in response, storing the particular token at the local token store.

16. The information handling system of claim 15, the operations further in response to obtaining the particular token:
   verifying the particular token, and in response, enabling, by the driver, the particular codec for the media file.

17. The information handling system of claim 10, the operations further in response to determining that the particular codec is not enabled at the information handling system:
   displaying, upon a display of the information handling system, a notification indicating that the particular codec is not enabled at the information handling system; and
   receiving, in response to the notification, user input indicating enablement of the codec.

18. The information handling system of claim 17, the operations in response to receiving the user input, transmitting the request to the cloud codec management service.

19. A non-transitory computer-readable medium storing software comprising instructions executable by one or more computers which, upon such execution, cause the one or more computers to perform operations comprising:
   accessing, by a driver, a local token store at a first time that stores one or more tokens, each token associated with a codec;
   identifying, by the driver, one or more codecs enabled at the information handling system based on the tokens stored by the local token store;
   receiving, at a media framework, a request to encode or decode a media file, the media file associated with a particular codec for encoding or decoding of the media file;
   determining, by the driver, that the particular codec is not enabled at the information handling system based on the previously identified enabled codecs;
   in response to determining that the particular codec is not enabled at the information handling system, transmitting a request to a cloud codec management service;
   receiving, from the cloud codec management service, the particular token, the particular token signed and unique to the information handling system;
   in response to receiving the particular token:
      storing the particular token at the local token store;
      restarting the driver, and in response, accessing, by the driver, the local token store at a second time after the first time;
      obtaining, by the driver and from the local token store, the particular token; and
   in response to obtaining the particular token, enabling, by the driver, the particular codec for the media file.

20. The non-transitory computer-readable medium of claim 19, the operations further including:
   in response to enabling the particular codec, encoding the media file utilizing the particular codec.

* * * * *